Feb. 18, 1947.  S. HOCHBERG  2,416,256

METHODS AND APPARATUS FOR MAKING AEROSOLS

Filed May 9, 1944

INVENTOR
SEYMORE HOCHBERG
BY Ridsdale Ellis
ATTORNEY

Patented Feb. 13, 1947

2,416,256

UNITED STATES PATENT OFFICE 2,416,256

METHOD AND APPARATUS FOR MAKING AEROSOLS

Seymore Hochberg, Forest Hills, N. Y., assignor of one-half to Victor Kuhn, La Mer, Leonia, N. J.

Application May 9, 1944, Serial No. 534,839

5 Claims. (Cl. 167—39)

This invention relates to a method and apparatus for making aerosols, the particles of which are predominantly within a predetermined size range.

Certain organic substances are highly toxic to insects such as mosquitoes. In fact the quantity required to kill a mosquito, in the case of $\beta\beta$-bis-p-chlorphenyl-$\alpha\alpha\alpha$ trichlorethane is so small that it is practicable to clear large areas of all living specimens by the simple process of producing a fog or aerosol of the reagent, either alone or preferably dissolved in oil. There is, of course, even for the most powerful agent a minimum dose.

Apparently the particles must be large enough to have appreciable downward velocity according to Stokes' law so that they can drop down on the body of the insect or on vegetation in the vicinity in sufficient amount to be lethal. On the other hand, if the droplets are too large they will fall to the ground too quickly and, therefore, will not travel a sufficient distance from the generator to be of practical value under ordinary atmospheric conditions. Further, with relatively large particles, say 100 microns radius, the procedure will be unduly expensive as requiring so much material to ensure contacting every mosquito in the area treated. The practical range of particle size is from 0.3 to 10 microns radius, with a preferred range of 1 to 5 microns.

One of the objects of the present invention is to provide a method and apparatus whereby an aerosol may be formed, the particles of which are predominantly (by percentage based on mass) within the above ranges of particle size.

The method consists essentially in forcing a gas containing droplets of liquid consisting of or containing the toxic agent through a narrow tube or passage to homogenize the droplets. Usually a tube is used which is small enough to be termed a capillary and that term will be used throughout the specification to denote a small diameter tube. For convenience the term tube or capillary will be used to include its functional equivalents, such as an annular or slit passage. As the important dimension is the maximum distance of any particle from the nearest wall, the term diameter will be used to indicate not only the size of a tube but also the distance between the facing walls of an annulus or slit.

In passing through the capillary the larger droplets are broken up. Possibly also the smaller particles are built up so that particles of intermediate size range result. If the capillary tube is of fair length, during the passage of the mixture therethrough, the latter will have time to come to substantial equilibrium so far as particle size is concerned.

Various methods may be used for producing the mixture of gas and droplets containing the toxic agent which is forced through the capillary to form the desired aerosol.

A preferred method is to mix or emulsify a volatile liquid such as water, with a less volatile liquid, such as relatively high flash-point oil, containing the toxic agent in solution and then heat the mixture or emulsion under pressure sufficiently to vaporize all or at least a substantial part of the volatile liquid.

I know of no formula for calculating the precise length and cross-section of the capillary and the pressure drop therethrough necessary to produce an aerosol having the majority of its particles within the desired size range. However, some general dimensions can be given with a specific example of pressures and dimensions, etc., which have been found suitable by actual test.

There are four main variables:

(1) Pressure drop between the two ends of the capillary.
(2) Length of capillary.
(3) Diameter of capillary.
(4) Gas-to-liquid ratio.

The pressure drop in the capillary should be much greater than is the case with the ordinary atomizers, paint sprayers and the like. Usually the pressure is over 50 lbs. gage and the normal pressure range is from 70 to 120 lbs. gage.

The length of the capillary should, in general, be not less than five times its diameter. For best results it should not be greatly less than an inch, especially if the diameter is near the upper limit.

The diameter of the capillary is usually under 0.2 inch.

All of these pressure and dimension figures can vary widely as it is their relative proportions which are the important factor in particle size determination. In fact the only factor whose effect alone can be predicted with any certainty is the gas-to-liquid ratio. As that ratio goes up the particle radius decreases.

Having set forth these general pressure and apparatus size values, I will now give one set of actual figures which test has shown are suitable.

An oil-in-water emulsion, 50% oil and 50% water is forced into a coil type of heater at a rate sufficient to maintain a pressure of 80 lbs. gage, at the entrance to the capillary. Heat is supplied to vaporize the water and superheat the steam to 210° C. The steam oil mixture is then passed through a capillary tube one inch long and 0.128 inch in diameter. The resulting aerosol contains particles, the majority of which (by percentage based on mass) are between one and five microns in radius.

Under these conditions, using an emulsion containing 50% oil, the volume ratio of gas-to-oil in the capillary is about 300 to 1.

When the steam temperature in the heater is around 210° C. it is advisable to use a relatively high flash point oil. One having a flash point in excess of 150° C. is better than one of lower flash point. The less viscous grades of lubricating oils work well.

Superheat is advantageous as the gas-to-liquid ratio may be difficult to keep constant when the product discharged through the capillary contains unvaporized water. If, as above explained, such ratio varies greatly the average particle size will change concomitantly. Moderate superheat (50° C. in the example given) provides a heat margin sufficient to ensure absence of unvaporized water.

One suitable form of apparatus is illustrated diagrammatically by way of example, in the accompanying drawing, wherein:

The figure shows an apparatus operated by the vaporization of a volatile liquid.

The apparatus shown in the drawing has a tank 15 for an emulsion of oil solution of the toxic agent in water. This emulsion is forced by a pump 16 into a coil 18 heated in any suitable way, such as a burner 19. From the coil, mixture of steam and oil (plus any unvaporized water) passes through the capillary 20 into the atmosphere. A pressure gage 21 indicates the pressure developed in the coil while a thermometer 22 shows the temperature. The rate of flow of material through the apparatus is controlled by regulating the speed of the pump.

While air and steam have been mentioned as gases suitable for the dispersing medium for the toxic aerosol, other gases or vapor of volatile liquids, such as methyl chloride, light hydrocarbons, alcohol, carbon tetrachloride, etc., may also be employed.

What I claim is:

1. The method of dispersing less volatile liquid with toxic substances in solution therein which involves propelling said liquid admixed with a more volatile liquid medium under pressure while applying heat sufficient to cause substantial vaporization of the latter to a volume many times that of the former, expanding the resultant vapor with the entrained less volatile liquid into and through a restricted elongated course of length several times its diameter under pressure sufficient to produce aerosols of said less volatile liquid with the toxic substance dissolved therein.

2. The method, which consists in applying to a mixture of oil containing substance toxic to insect life and water, heat sufficient to vaporize substantial proportions of the water and expanding the resultant vapor with the droplets of oil entrained thereby and that contain the toxic substance through a restricted course having a length several times its diameter, under pressure sufficient to produce aerosols of said oil with the toxic substance dissolved therein.

3. The method, which consists in applying to an emulsion having a water phase and an oil phase, one of said phases containing a substance toxic to insect life, heat sufficient to vaporize a substantial proportion of the phase substantially free of toxic substance and expanding the resultant vapor with the liquid droplets entrained thereby through a restricted course having a length several times its diameter under pressure sufficient to produce aerosols bearing said toxic substance.

4. The method as claimed in claim 1, which consists in forming said restricted course of diameter less than 0.2 inch and of length at least five times its diameter, and maintaining a pressure at the beginning of said restricted course in excess of fifty pounds with resultant aerosol droplets of said entrained liquid of radius from 0.3 to 10 microns.

5. The method as claimed in claim 1, which consists in forming said restricted course of diameter less than 0.2 inch and of length at least five times its diameter, in which the vaporizable liquid medium is water and the entrained liquid is an oil containing in solution therein a substance toxic to insect life, in which said water and oil are in the form of an emulsion which has a flash point above 150° C. in which the pressure evolved and maintained at the inlet to the restricted course is in the range of from seventy to one hundred twenty pounds gauge with resultant aerosol droplets of said entrained liquid of radius of from 0.3 to 10 microns.

SEYMORE HOCHBERG.

REFERENCES CITED

The following references are of record in the file of this patent:

UNITED STATES PATENTS

| Number | Name | Date |
|---|---|---|
| 1,332,520 | Richard et al. | Mar. 2, 1920 |
| 2,123,767 | Clayton et al. | July 12, 1938 |
| 2,364,199 | Derr | Dec. 5, 1944 |
| | (filed Jan. 18, 1943) | |
| 2,250,034 | Rich | July 22, 1946 |
| 2,106,627 | Brennan | Jan. 25, 1938 |
| 2,402,402 | Hickman | June 18, 1946 |

Certificate of Correction

Patent No. 2,416,256.                                                                                           February 18, 1947.

SEYMORE HOCHBERG

It is hereby certified that the name and address of the assignee of one-half interest in the above numbered patent was erroneously written and printed as "Victor Kuhn, of La Mer, Leonia, New Jersey," whereas said name and address should have been written and printed as *Victor Kuhn La Mer, of Leonia, New Jersey*, as shown by the record of assignments in this Office, and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.*